(12) United States Patent  
Thibault

(10) Patent No.: US 6,250,813 B1
(45) Date of Patent: Jun. 26, 2001

(54) BEARING ASSEMBLY WITH HOUSING CAP AND SEAL

(75) Inventor: James Thibault, Torrington, CT (US)

(73) Assignee: The Torrington Company, Torrington, CT (US)

(*) Notice: Subject to any disclaimer, the term of this patent is extended or adjusted under 35 U.S.C. 154(b) by 0 days.

(21) Appl. No.: 09/017,106

(22) Filed: Jan. 31, 1998

(51) Int. Cl.$^7$ .................................................. F16C 23/04
(52) U.S. Cl. .......................... 384/495; 384/498; 277/581
(58) Field of Search .................................. 384/495, 496, 384/497, 498, 477, 481, 482, 484, 485, 486, 487, 489, 480; 277/579, 580, 581, 149; 251/175

(56) References Cited

U.S. PATENT DOCUMENTS

| | | | |
|---|---|---|---|
| 1,094,312 | * 4/1914 | Delmez | 384/498 |
| 1,336,352 | * 4/1920 | Hegelman | 384/487 |
| 1,578,237 | * 3/1926 | Reynolds | 384/498 |
| 1,908,956 | 5/1933 | Chievitz . | |
| 2,348,939 | * 5/1944 | Thompson | 277/580 |
| 2,630,356 | 3/1953 | Johnson . | |
| 3,050,311 | * 8/1962 | Mikell | 277/581 |
| 3,656,824 | * 4/1972 | Ullberg | 384/482 |
| 3,967,829 | * 7/1976 | Rogers | 277/149 |
| 4,632,360 | * 12/1986 | DeSalve | 251/175 |
| 4,895,460 | 1/1990 | Grzina . | |
| 5,121,999 | * 6/1992 | Johnson et al. | 384/477 |
| 5,221,147 | * 6/1993 | Schiel et al. | 384/487 |
| 5,288,154 | 2/1994 | Jost . | |
| 5,328,276 | * 7/1994 | Linteau | 384/477 |
| 5,536,090 | * 7/1996 | Nisley | 384/498 X |
| 5,655,845 | 8/1997 | Lampart . | |
| 5,836,700 | * 11/1998 | Wilkie, Jr. et al. | 384/480 |

* cited by examiner

Primary Examiner—David A. Bucci
Assistant Examiner—Colby Hansen
(74) Attorney, Agent, or Firm—John C. Bigler

(57) ABSTRACT

A bearing having a spherically convex radially outer surface is pivotably mounted in a spherically concave bore of a bearing housing. An annular housing cap is mounted against an axial end of the bearing housing, the housing cap having a radially inwardly directed annular groove and providing clearance with respect to the rotatable shaft such that pivoting of the bearing within the housing is permitted. At least two split laminar rings located within the annular groove of the housing cap are spring-loaded radially inwardly for biased engagement with the rotatable shaft.

8 Claims, 6 Drawing Sheets

BEARING ASSEMBLY WITH HOUSING CAP AND SEAL

BACKGROUND OF THE INVENTION

This invention relates generally to self-aligning bearings and, more particularly, to self-aligning bearing assemblies with shields or seals suitable for applications characterized by harsh, highly abrasive environments.

One such application is that of mounting the auger of asphalt road paving equipment. Bearing assemblies in that application are constantly exposed to highly abrasive asphalt mixtures and high temperatures and are frequently subjected to petroleum based solvent wash-downs. Current paver bearing assemblies use a shaft mounted shield to protect them from asphalt intrusion. Those shields quickly deteriorate due to the constant abrasion of the shield rotating through the asphalt mixture. Once the outer shield has worn, contamination penetrates the interior of the bearing and failure is rapid. Additionally, it is difficult to positively seal the rotating shield against the bearing. This lack of positive sealing allows a path for contamination to enter the bearing assembly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a self-aligning bearing assembly for mounting over a rotatable shaft. A bearing having a spherically convex radially outer surface is pivotably mounted in a spherically concave bore of a bearing housing. An annular housing cap is mounted against an axial end of the bearing housing, the housing cap having a radially inwardly directed annular groove and providing clearance with respect to the rotatable shaft such that pivoting of the bearing within the housing is permitted. At least two split laminar rings located within the annular groove of the housing cap are spring-loaded radially inwardly for biased engagement with the rotatable shaft.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
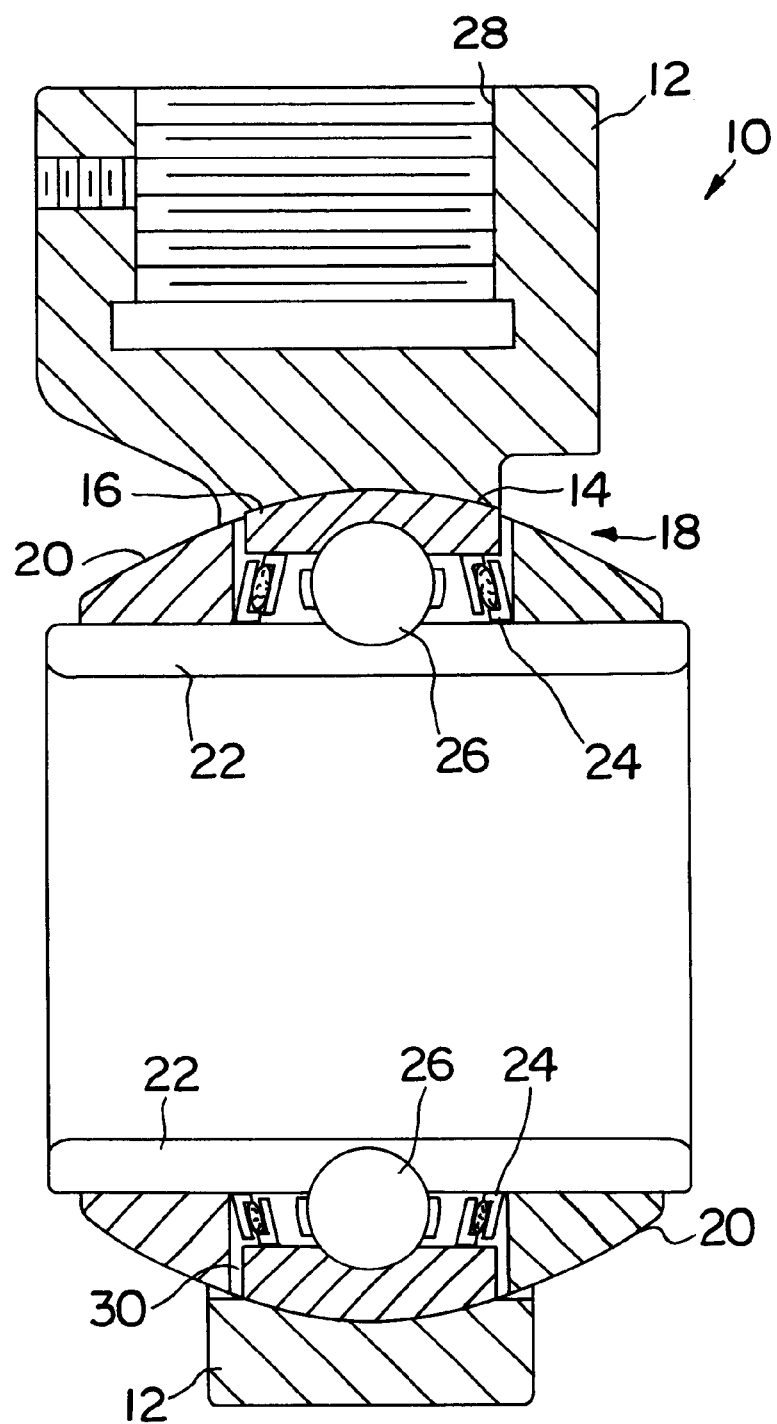
FIG. 1 is a cross-sectional side view illustrating a prior art bearing assembly as used with current road paving equipment.

Referring now to the drawings, FIG. 1 illustrates prior art bearing assembly 10, as used to support an auger in current asphalt road paving equipment. Bearing housing 12 has spherically concave bore 14 for supporting a spherically convex surface of bearing outer ring 16 of self-aligning bearing 18. Metal shield 20 is pressed on wide bearing inner ring 22 to provide protection for bearing seal 24 and rolling elements 26.

In this prior art design, metal shield 20 rotates with the shaft over which the bearing is mounted. As a result, metal shield 20 constantly rotates through the asphalt mixture that is being moved along the shaft by the blades of the auger. Bearing housing 12 is stationary, mounted on the road paving equipment by means of threaded receptacle 28. Due to rotation of metal shield 20 with respect to bearing outer ring 16 and bearing housing 12, gaps 30 are provided, resulting in contamination penetrating to bearing seal 24 and rapidly progressing to rolling elements 26, causing failure. Significantly, there is no protection for the surfaces providing the pivoting movement between spherically self-aligning bearing 18 and bearing housing 12.

Figure 2:
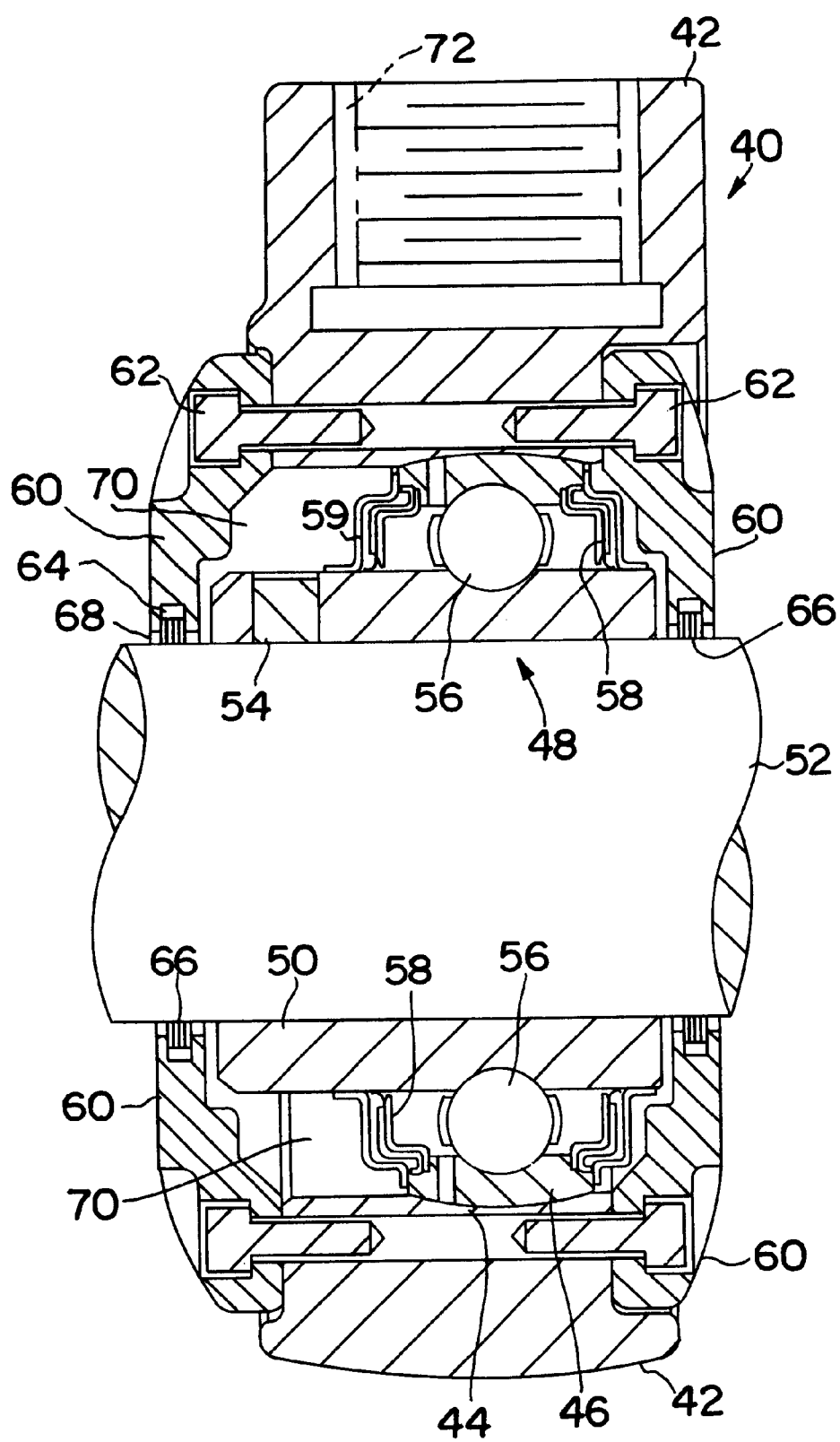
FIG. 2 is a cross-sectional side view illustrating a first embodiment of the self-aligning bearing assembly of the present invention, taken along the line 2—2 of FIG. 3.
Figure 2A:
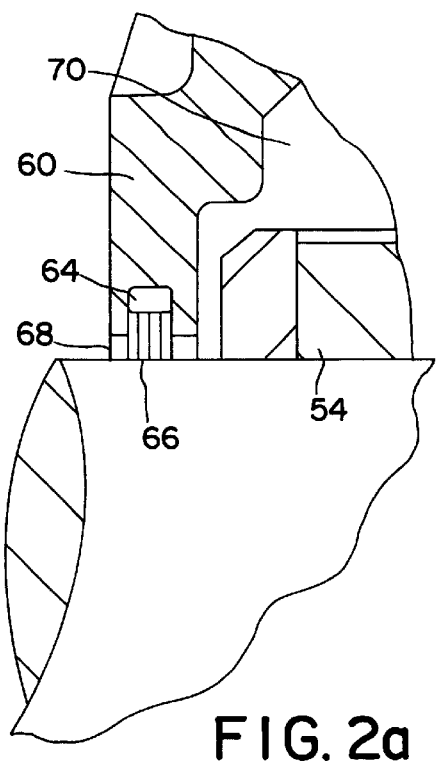
FIG. 2a is an enlarged, detail view of portions of FIG. 2.
Figure 4A:
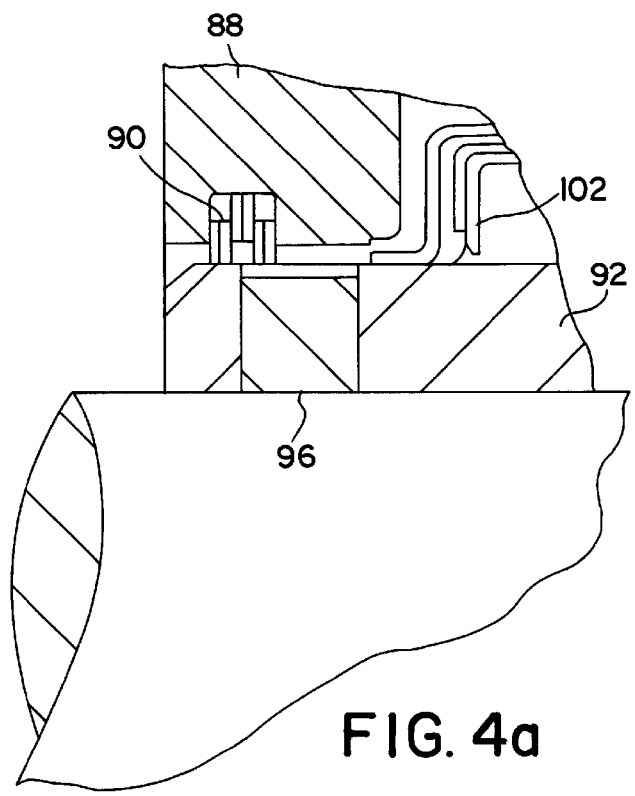
FIG. 4a is an enlarged, detail view of portions of FIG. 4.
Figure 3:
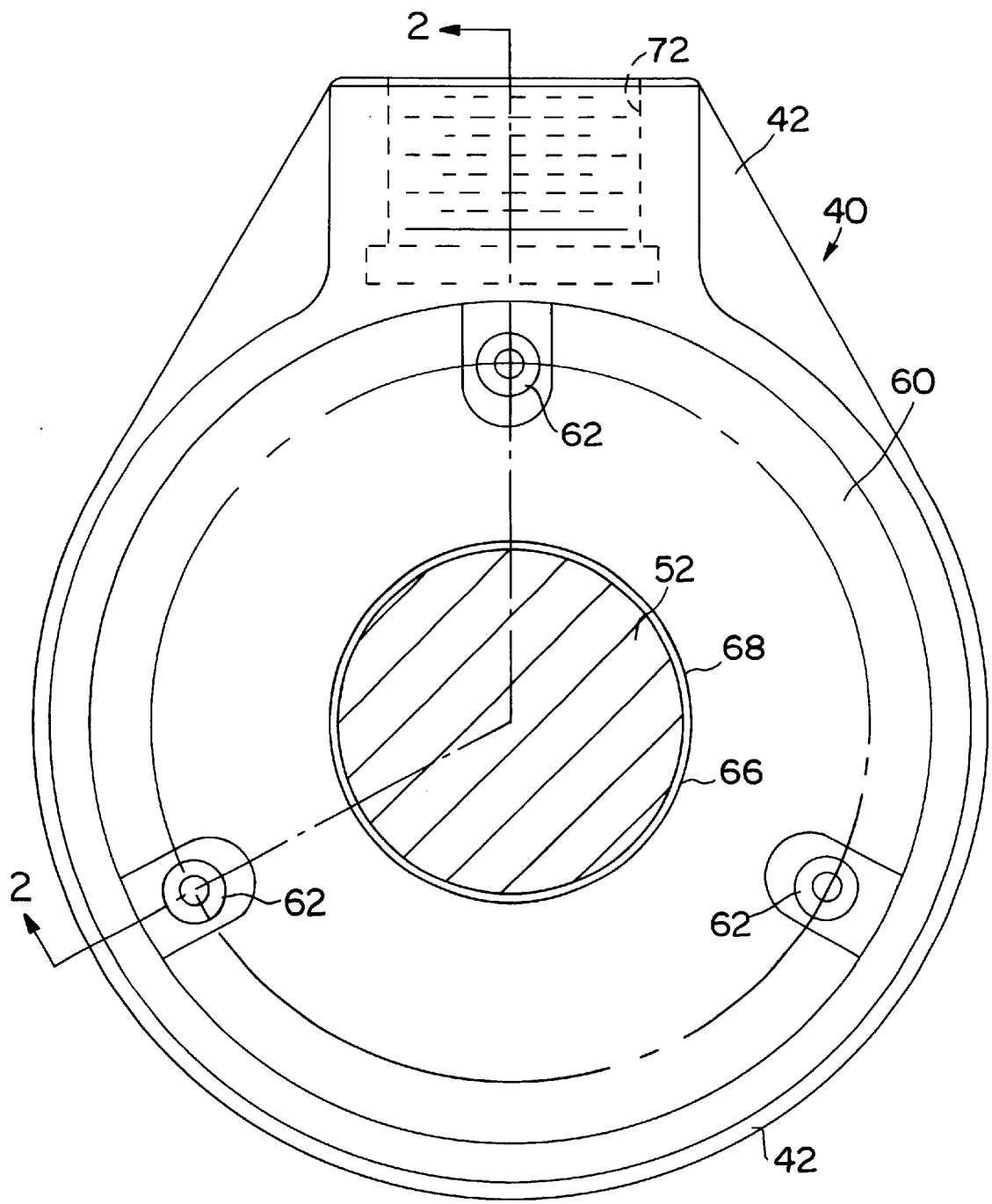
FIG. 3 is an end view illustrating the self-aligning bearing assembly of FIG. 2.

FIGS. 2 and 3 illustrate bearing assembly 40, a first embodiment of the present invention that could be used in an application similar to that of bearing assembly 10. Bearing housing 42 has spherically concave bore 44 for supporting a spherically convex surface of bearing outer ring 46 of self-aligning bearing 48. Wide bearing inner ring 50 is mounted on rotatable shaft 52 by set screw 54. Rolling elements 56 roll in raceways of bearing outer and inner rings 46 and 50 and are protected by multi-piece bearing seals 58 that include outboard flinger 59 mounted on bearing inner ring 50.

Annular housing caps 60 are mounted against axial ends of bearing housing 42 by cap screws 62 or other means and includes radially inwardly directed groove 64. At least two split laminar rings 66 are located within annular groove 64, the rings being spring-loaded radially inwardly for biased engagement with rotatable shaft 52. Additional split laminar rings may be provided for biased engagement with either bearing caps 60 or rotatable shaft 52. Central bore 68 of bearing cap 60 and annular groove 62 provide sufficient clearance with respect to rotatable shaft 52 and split laminar rings 66 to allow pivoting of bearing outer ring 46 relative to bearing housing 42.

Annular groove 64 and split laminar rings 66 provide a barrier restricting contamination to interior portion 70. Unlike traditional labyrinth type seals, they accommodate the required self-aligning motion of bearing 48. Significantly, bearing caps 60 are stationary; they are not fixed to the rotatable shaft and do not rotate through the asphalt mixture. Bearing caps 60 provide protection for spherically concave surface 44 of bearing housing 62 and the corresponding spherically convex surfaces of bearing outer ring 46. This protection is in addition to that provided for bearing seals 58 and rolling elements 56. Bearing housing 42 is mounted by threaded receptacle 72.

Figure 4:
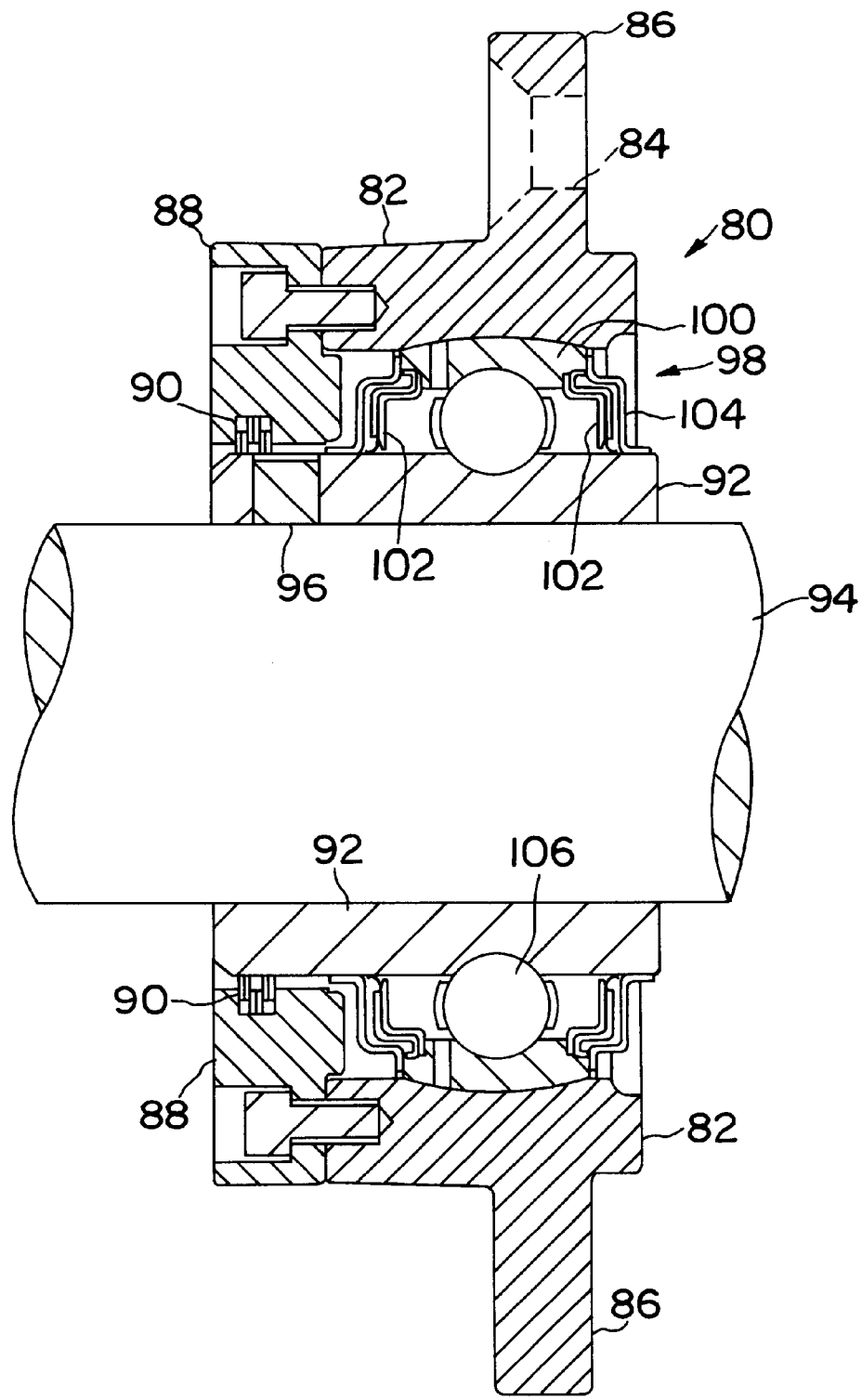
FIG. 4 is a cross-sectional side view illustrating a second embodiment of the self-aligning bearing assembly of the present invention, taken along the line 4—4 of FIG. 5.
Figure 5:
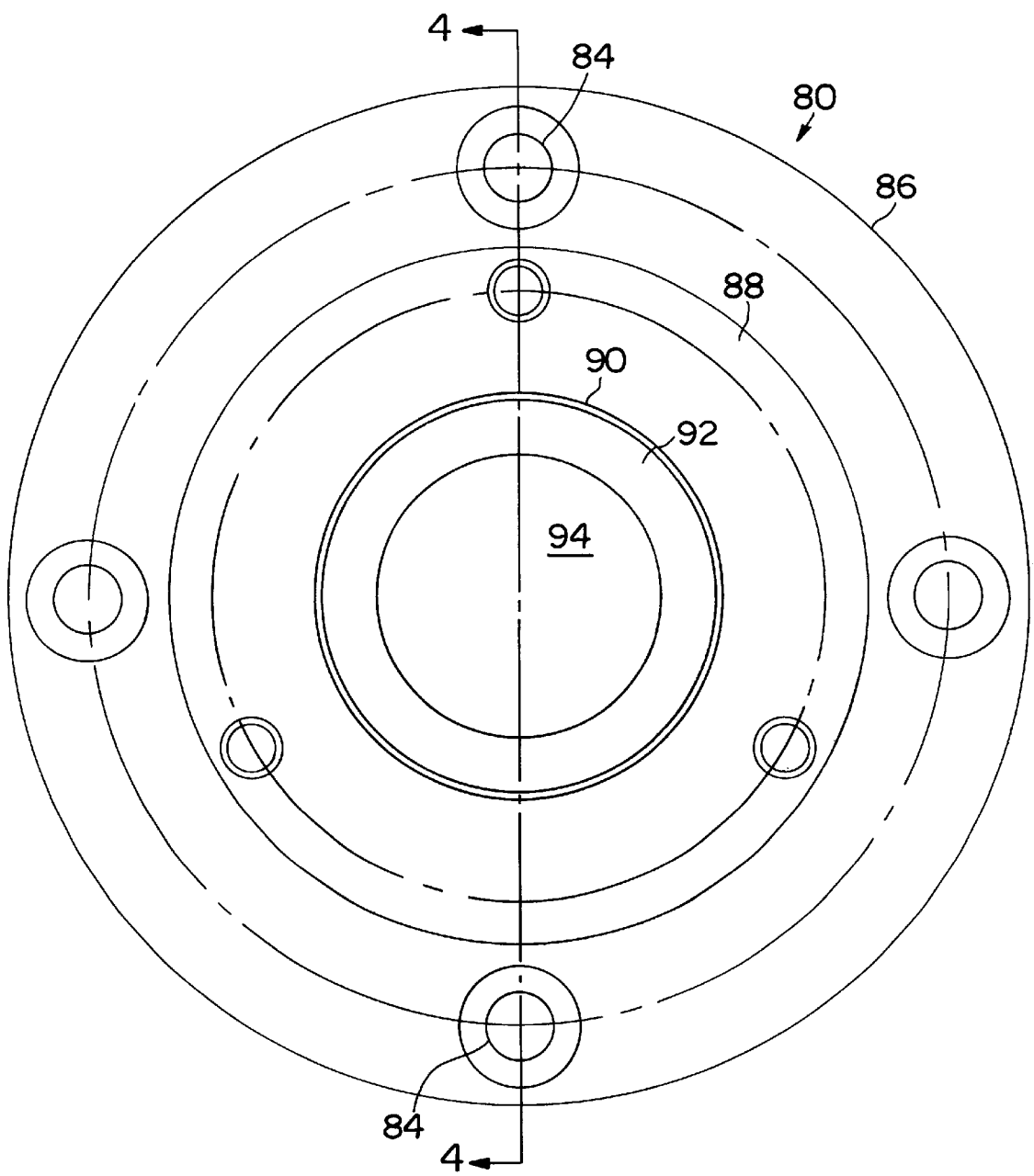
FIG. 5 is an end view illustrating the self-aligning bearing assembly of FIG. 4.

FIGS. 4 and 5 illustrate a second embodiment of the present invention similar to that of FIGS. 2 and 3 but having bearing assembly 80 in bearing housing 82 that is mounted by bolts or screws in apertures 84 of annular mounting flange 86. Only single bearing cap 88, similar to bearing caps 60, is necessary because the structure upon which bearing housing 82 is mounted provides protection from the other side of bearing assembly 80. This embodiment illustrates that split laminar rings 90 may include radially outwardly directed spring-loading that provides biased contact with bearing cap 88.

In the embodiment of FIGS. 4 and 5, split laminar rings 90 are biased radially inwardly against wide bearing inner ring 92, rather than against rotatable shaft 94. The effect is similar, since wide bearing inner ring 92 is fixed to rotatable shaft 94 by set screw 96 or other means. Self-aligning bearing 98 includes bearing outer ring 100, multi-piece bearing seals 102 with flinger 104, and rolling elements 106, each similar to those of the embodiment of FIGS. 2 and 3.

The present invention is applicable to a wide range of bearing configurations suitable for various applications that require protection for a self-aligning bearing. For example, the self-aligning bearing may be a plain bearing with no rolling elements or may be a rolling element bearing with no bearing inner ring, the rolling elements rolling directly on raceways provided on the rotatable shaft. Note that the embodiment of FIGS. 4 and 5 may be thought of as having a self-aligning rolling element bearing with no bearing inner raceway, with the split laminar rings biased radially inwardly against the rotatable shaft, the rotatable shaft being hollow.

From the above description, it will be apparent that the present invention provides a self-aligning bearing assembly with greatly improved resistance to abrasion, high temperature and solvent. The disclosed configuration is particularly suitable for harsh applications such as, for example, mounting of augers of asphalt road paving equipment, and may be adapted to many other applications.

What is claimed is:

1. A self-aligning bearing assembly for mounting over a rotatable shaft, the bearing assembly comprising:

a bearing housing having a spherically concave bore;

a bearing having a spherically convex radially outer surface pivotably mounted in the housing spherically concave bore;

an annular housing cap mounted against an axial end of the bearing housing, the housing cap having a radially inwardly directed annular groove and configured to provide clearance with respect to a rotatable shaft such that pivoting of the bearing within the housing is permitted; and a plurality of split laminar rings located within the annular groove of the housing cap, at least two of the split laminar rings being biased radially inwardly for concentric engagement with the rotatable shaft.

2. The self-aligning bearing assembly according to claim 1, wherein the bearing includes an outer ring providing the spherically convex outer surface, an inner ring to be positioned over the rotatable shaft, and rolling elements therebetween.

3. The self-aligning bearing assembly according to claim 2, wherein the bearing includes a multi-piece bearing seal having one part mounted on the outer ring and another part mounted on the inner ring for retaining lubricant within the bearing and for preventing contamination of the bearing.

4. The self-aligning bearing assembly according to claim 1, wherein at least one of the split laminar rings is biased radially outwardly into concentric engagement with the housing cap.

5. The self-aligning bearing assembly according to claim 1, further comprising:

a second annular housing cap mounted against a second axial end of the annular housing, the second housing cap having a radially inwardly directed second annular groove and providing clearance with respect to the rotatable shaft such that pivoting of the bearing within the housing is permitted; and a plurality of split laminar rings located within the annular groove of the second annular housing cap, at least two of the split laminar rings being biased radially inwardly into concentric engagement with the rotatable shaft.

6. The self-aligning bearing assembly according to claim 1, wherein the bearing housing includes an annular flange for mounting of the housing cap.

7. The self-aligning bearing assembly according to claim 1, wherein the bearing housing includes a radially directed threaded bore for mounting of the bearing housing.

8. A self-aligning bearing assembly for mounting over a rotatable shaft, the bearing assembly comprising:

a bearing housing having a spherically concave bore;

a bearing having a bearing outer ring with a spherically convex radially outer surface pivotably mounted in the housing spherically concave bore and having a bearing inner ring for mounting over a rotatable shaft;

an annular housing cap mounted against an axial end of the bearing housing and located radially outwardly of the bearing inner ring, the housing cap having a radially inwardly directed annular groove and providing clearance with respect to the bearing inner ring such that pivoting of the bearing within the housing is permitted; and a plurality of split laminar rings located within the annular groove of the housing cap, at least two of the split laminar rings being biased radially inwardly into concentric engagement with the bearing inner ring.

* * * * *